US010665267B2

(12) United States Patent
Klinger et al.

(10) Patent No.: US 10,665,267 B2
(45) Date of Patent: *May 26, 2020

(54) CORRELATION OF RECORDED VIDEO PRESENTATIONS AND ASSOCIATED SLIDES

(71) Applicant: International Business Machines Corporation, Armonk, NY (US)

(72) Inventors: Doina L. Klinger, Winchester (GB); David J. Nice, Southampton (GB); Rebecca M. Quaggin-Mitchell, Hampshire (GB); Fenglian Xu, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/423,475

(22) Filed: May 28, 2019

(65) Prior Publication Data

US 2019/0279685 A1 Sep. 12, 2019

Related U.S. Application Data

(63) Continuation of application No. 15/446,060, filed on Mar. 1, 2017, now Pat. No. 10,347,300.

(51) Int. Cl.
*G11B 27/34* (2006.01)
*G11B 27/10* (2006.01)
(Continued)

(52) U.S. Cl.
CPC ............ *G11B 27/34* (2013.01); *G06F 40/134* (2020.01); *G11B 27/036* (2013.01);
(Continued)

(58) Field of Classification Search
CPC ..... G11B 27/34; G11B 27/036; G11B 27/102; G11B 27/32; G06F 17/2235; G10L 15/26; G10L 25/78
See application file for complete search history.

(56) References Cited

U.S. PATENT DOCUMENTS 5,703,655 A    12/1997   Corey et al.
6,701,014 B1    3/2004    Syeda-Mahmood
(Continued)

FOREIGN PATENT DOCUMENTS

WO      2008003095 A2    1/2008

OTHER PUBLICATIONS

Huang, Wanli et al., "The Multimedia Educational Resources Editing System on Synchronization of PPT Presentation Videos and Electronic Slides", Proceedings of 2008 IEEE International Symposium on IT in Medicine and Education, pp. 790-795.

(Continued)

*Primary Examiner* — Thai Q Tran
*Assistant Examiner* — Sunghyoun Park
(74) *Attorney, Agent, or Firm* — William H. Hartwell; Maxine L. Barasch; Keohane & D'Alessandro PLLC

(57) ABSTRACT

Techniques are disclosed for performing a computer-implemented processing of slide presentation videos to automatically generate index locations corresponding to particular slides within a slide presentation video. In embodiments, a slide presentation video is uploaded to a video processing system. The video processing system performs an image analysis to identify each slide within the slide presentation and determine a time window for each occurrence of each slide. An audio analysis is performed to adjust the time window to the start of a sentence that precedes the introduction of the slide. A user interface includes one or more selectable links associated with each slide that link to a (Continued)

corresponding location within the slide presentation video. Similarly, a processed slide presentation video includes selectable links to index to the corresponding slide of the presentation.

20 Claims, 11 Drawing Sheets

(51) Int. Cl.
    *G11B 27/036*     (2006.01)
    *G11B 27/32*     (2006.01)
    *G11B 27/28*     (2006.01)
    *G06F 40/134*     (2020.01)
    *G10L 25/78*     (2013.01)
    *G10L 15/26*     (2006.01)

(52) U.S. Cl.
    CPC ............ *G11B 27/102* (2013.01); *G11B 27/28* (2013.01); *G11B 27/32* (2013.01); *G11B 27/326* (2013.01); *G10L 15/26* (2013.01); *G10L 25/78* (2013.01)

(56) References Cited

U.S. PATENT DOCUMENTS

| | | |
|---|---|---|
| 7,454,763 B2 | 11/2008 | Veselova et al. |
| 8,150,216 B2 | 4/2012 | Retterath et al. |
| 8,677,240 B2 | 3/2014 | Sanders et al. |
| 2002/0164151 A1 | 11/2002 | Jasinschi et al. |
| 2002/0180803 A1 | 12/2002 | Kaplan et al. |
| 2004/0001106 A1 | 1/2004 | Deutscher et al. |
| 2004/0027370 A1* | 2/2004 | Jaeger ................ G06F 3/0481 715/716 |
| 2004/0071453 A1* | 4/2004 | Valderas ............. G11B 27/105 386/333 |
| 2006/0067578 A1 | 3/2006 | Fuse |
| 2006/0093309 A1* | 5/2006 | Herberger ........... G11B 27/034 386/280 |
| 2007/0006077 A1 | 1/2007 | Grubbs |
| 2008/0092051 A1* | 4/2008 | Sidon .................. G06F 16/9038 715/731 |
| 2008/0228490 A1 | 9/2008 | Fischer et al. |
| 2009/0164512 A1* | 6/2009 | Aizenbud-Reshef ....................... G06F 16/489 |
| 2011/0112832 A1 | 5/2011 | Prorock et al. |
| 2011/0134321 A1 | 6/2011 | Berry et al. |
| 2011/0138020 A1 | 6/2011 | Pantos et al. |
| 2011/0231184 A1 | 9/2011 | Kerr |
| 2014/0250355 A1 | 9/2014 | Jimison et al. |
| 2014/0363143 A1 | 12/2014 | Dharssi et al. |
| 2015/0127340 A1* | 5/2015 | Epshteyn ................ G10L 15/26 704/235 |
| 2015/0199350 A1* | 7/2015 | Raman ................ G06F 16/4393 715/202 |
| 2016/0358627 A1* | 12/2016 | Boling ................ G06F 16/4393 |
| 2017/0249058 A1 | 8/2017 | Fisher et al. |
| 2018/0254069 A1 | 9/2018 | Klinger et al. |

OTHER PUBLICATIONS

Hong, Chuleui et al., "The Multimedia Authoring in Collaborative E-Learning System", ISSDM, Oct. 23-25, 2012, pp. 158-161.
Sunghyoun Park, USPTO Office Action, U.S. Appl. No. 15/446,060, dated Apr. 2, 2018, 16 pages.
Sunghyoun Park, USPTO Final Office Action, U.S. Appl. No. 15/446,060, dated Nov. 16, 2018, 11 pages.
Sunghyoun Park, USPTO Notice of Allowance and Fees Due, U.S. Appl. No. 15/446,060, dated Feb. 26, 2019, 11 pages.

* cited by examiner

US 10,665,267 B2

CORRELATION OF RECORDED VIDEO PRESENTATIONS AND ASSOCIATED SLIDES

CROSS-REFERENCE TO RELATED APPLICATIONS

The present patent document is a continuation of U.S. patent application Ser. No. 15/446,060, filed Mar. 1, 2017, entitled "CORRELATION OF RECORDED VIDEO PRESENTATIONS AND ASSOCIATED SLIDES", the entire contents of which is incorporated herein by reference.

FIELD OF THE INVENTION

The present invention relates generally to multimedia presentations, and more particularly, to correlation of recorded video presentations and associated slides.

BACKGROUND

Slide presentations are commonplace in a wide variety of organizations. These include government organizations, educational institutions, and corporations. The slide presentations can be used to inform the viewer about new policies, or help the viewer learn a new skill or academic lesson. Frequently, a video of a presenter giving a slide presentation is made available to a group of people or, in some cases, the general public. On public video sharing websites, many such videos exist. In some cases, the presentation can contain information not found in the slides themselves. Thus, the presentations can be vital in understanding the subject matter of the slides. It is therefore desirable to have improvements in the organization of disseminated presentation information.

SUMMARY

In one aspect, there is provided a computer-implemented method for creating a linked index for a slide presentation video, comprising: generating a list of slides; determining a list of time windows for each slide; determining a relevance score for each time window; and for each time window with the relevance score exceeding a predetermined threshold, generating a link to a position in the slide presentation video, wherein the link is associated with a slide from the list of slides.

In another aspect, there is provided an electronic device comprising: a processor; a memory coupled to the processor, the memory containing instructions, that when executed by the processor, perform the steps of: analyzing a slide presentation video to generate a list of slides; determining a list of time windows for each slide; determining a relevance score for each time window; and for each time window with the relevance score exceeding a predetermined threshold, generating a link to a position in the slide presentation video, wherein the link is associated with a slide from the list of slides.

In yet another aspect, there is provided a computer program product for creating a linked index for a slide presentation video on an electronic computing device, the electronic computing device comprising a computer readable storage medium having program instructions embodied therewith, the program instructions executable by a processor to cause the electronic computing device to: analyze the slide presentation video to generate a list of slides; determine a list of time windows for each slide; determine a relevance score for each time window; and for each time window with the relevance score exceeding a predetermined threshold, generate a link to a position in the slide presentation video, wherein the link is associated with a slide from the list of slides.

BRIEF DESCRIPTION OF THE DRAWINGS

Features of the disclosed embodiments will be more readily understood from the following detailed description of the various aspects of the invention taken in conjunction with the accompanying drawings.

Figure 1:
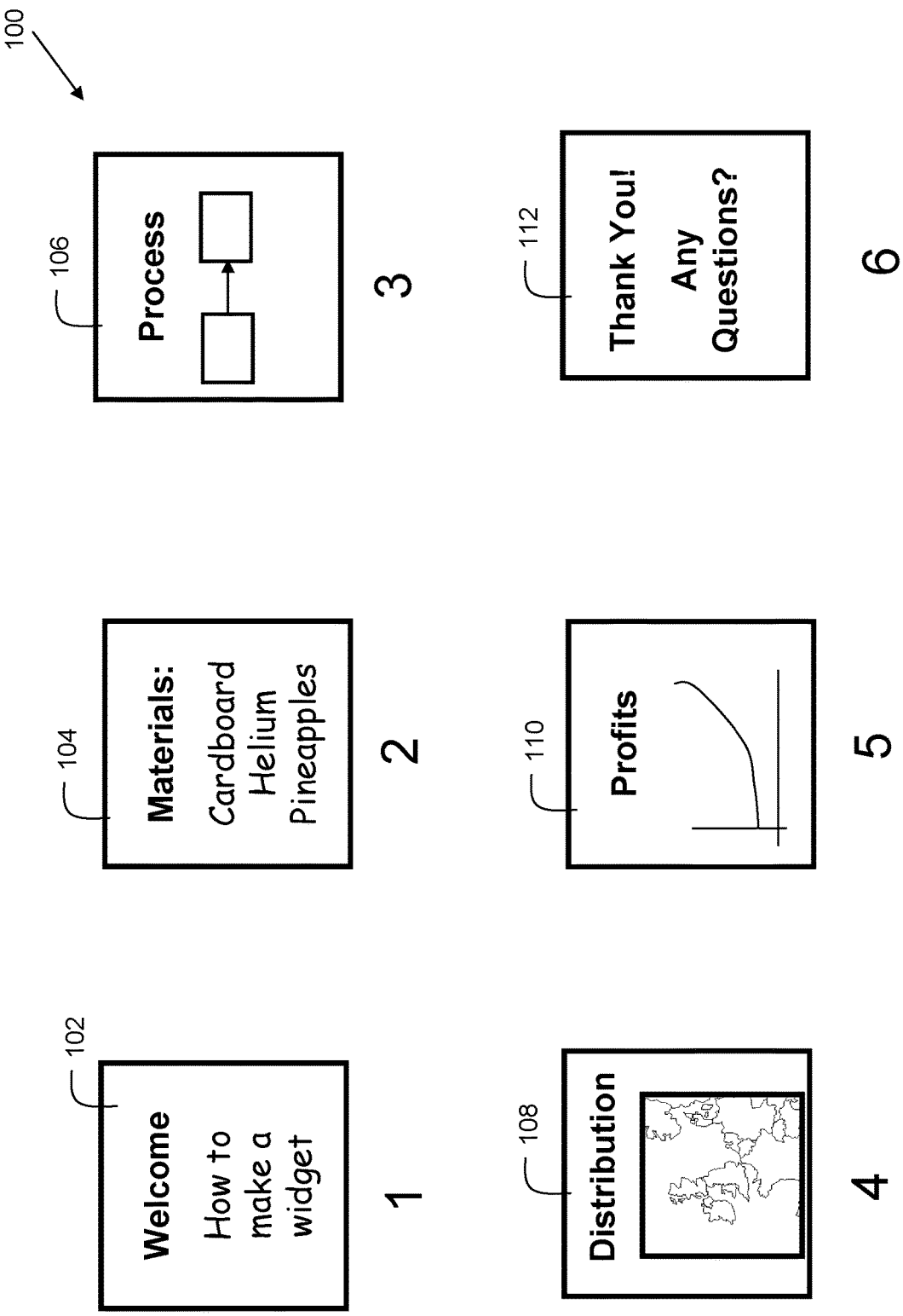
FIG. 1 shows an exemplary slide presentation.

The drawings are not necessarily to scale. The drawings are merely representations, not necessarily intended to portray specific parameters of the invention. The drawings are intended to depict only example embodiments of the invention, and therefore should not be considered as limiting in scope. In the drawings, like numbering may represent like elements. Furthermore, certain elements in some of the figures may be omitted, or illustrated not-to-scale, for illustrative clarity.

DETAILED DESCRIPTION

Techniques are disclosed for performing a computer-implemented processing of slide presentation videos to automatically generate index locations corresponding to particular slides within a slide presentation video. In embodiments, a slide presentation video is uploaded to a video processing system. The video processing system performs an image analysis to identify each slide within the slide presentation and determine a time window for each occurrence of each slide. An audio analysis may be performed to adjust the time window to the start of a sentence that precedes the introduction of the slide. A user interface may include one or more selectable links associated with each slide that link to a corresponding location within the slide presentation video. Similarly, a processed slide presentation video includes selectable links to index to the corresponding slide of the presentation. In this way, slide presentations can easily be disseminated in a searchable format. In many cases, a user may not have time to view the presentation in its entirety. The user may only have time for, or interest in, a subset of the slides within the slide presentation. Disclosed embodiments allow a user to, among other things, quickly access relevant portions of a slide presentation video that correspond to the slide(s) of interest. This allows for a more efficient distribution of information within a video. This has various uses that include, but are not limited to, corporate, academic, and news applications.

Reference throughout this specification to "one embodiment," "an embodiment," "some embodiments", or similar language means that a particular feature, structure, or characteristic described in connection with the embodiment is included in at least one embodiment of the present invention. Thus, appearances of the phrases "in one embodiment," "in an embodiment," "in some embodiments", and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope and purpose of the invention. Thus, it is intended that the present invention cover the modifications and variations of this invention provided they come within the scope of the appended claims and their equivalents. Reference will now be made in detail to the preferred embodiments of the invention.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", or "has" and/or "having", when used in this specification, specify the presence of stated features, regions, integers, steps, operations, elements, and/or components, but do not preclude the presence or addition of one or more other features, regions, integers, steps, operations, elements, components, and/or groups thereof.

FIG. 1 shows an exemplary slide presentation 100. The slide presentation 100 comprises six slides, indicated as reference numbers 102, 104, 106, 108, 110, and 112. These slides are presented by a human presenter, and a video recording of the presentation is made. Note that while six slides are shown in this example, in practice, more slides or fewer slides may be present in the slide presentation.

Figure 2:
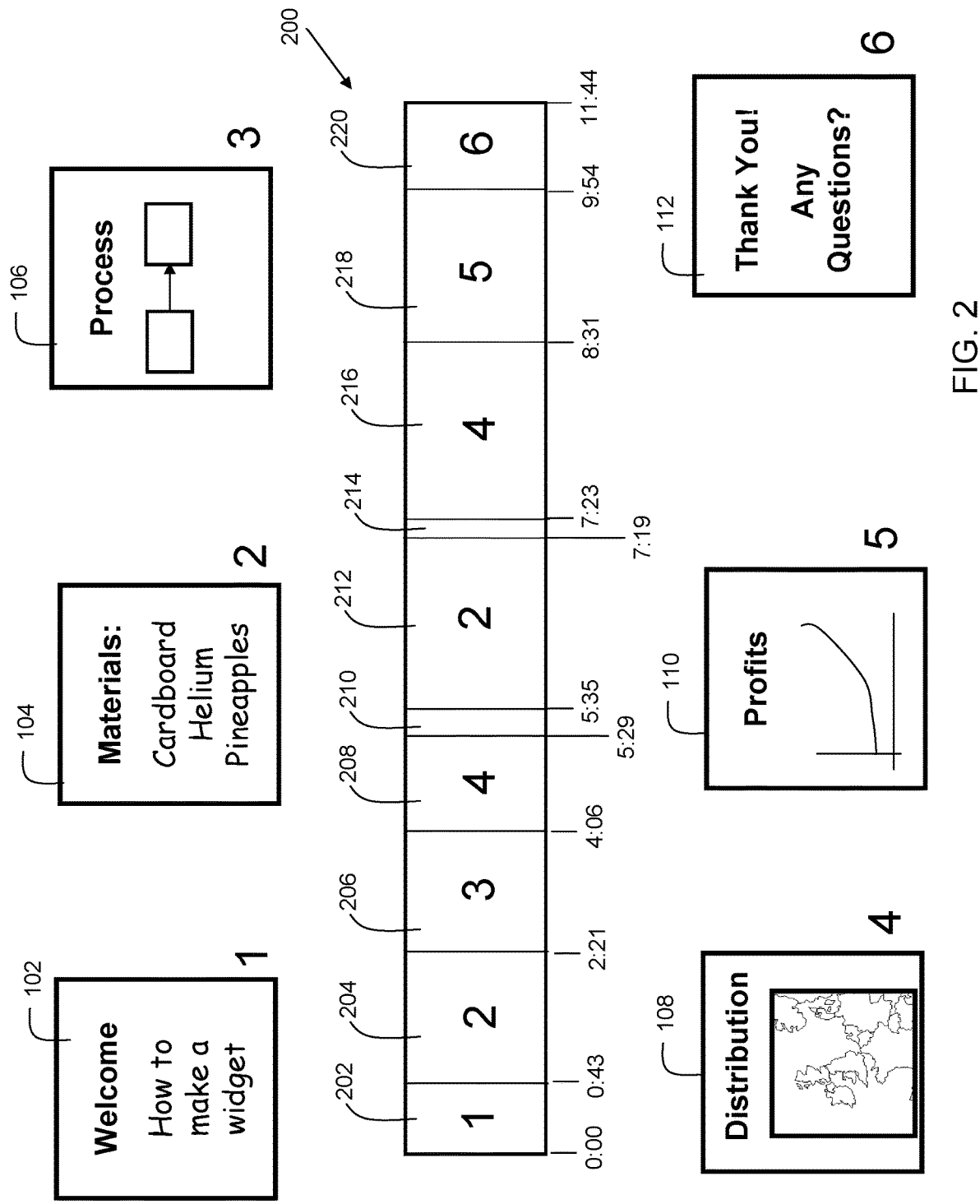
FIG. 2 shows a temporal sequencing of the exemplary slide presentation of FIG. 1.

FIG. 2 shows a temporal sequencing of the exemplary slide presentation of FIG. 1. Temporal indicator 200 shows a representation of time windows for each slide. Time window 202 starts from time 0:00 to time 0:43 and shows slide 1. Time window 204 starts from time 0:43 to time 2:21 and shows slide 2. Time window 206 starts from time 2:21 to time 4:06 and shows slide 3. Time window 208 starts from time 4:06 to time 5:29 and shows slide 4. After time 5:29, the presenter decides to return to slide 2 again. Time window 210 is a brief time window starting at 5:29 and ending at 5:35. During time window 210, slide 3 is shown as the presenter is returning to slide 2. Thus, time window 210 is a very short time window with no meaningful presenter dialog associated with it. Time window 212 starts from time 5:35 to time 7:19 and shows slide 2 for a second time. After time 7:19, the presenter decides to return to slide 4 again.

Time window 214 is a brief time window starting at 7:19 and ending at 7:23. During time window 214, slide 3 is shown as the presenter is returning to slide 4. Thus, time window 214 is a very short time window with no meaningful presenter dialog associated with it. These short time windows may be discarded during the processing of the original slide presentation video. Thus, embodiments can include discarding a time window in response to a duration of the time window being less than a predetermined threshold. In embodiments, the relevance score of the time window can be equal to the duration of the time window. For example, if the relevance score (duration) is less than ten seconds, the time window may be discarded. Time window 216 starts from time 7:23 to time 8:31 and shows slide 4 for a second time. Time window 218 starts from time 8:31 to time 9:54 and shows slide 5. Time window 220 starts from time 9:54 to time 11:44 and shows slide 6. The presentation concludes at 11:44. This example slide presentation and temporal sequence of the slide presentation will be used in the explanation of disclosed embodiments.

Figure 3:
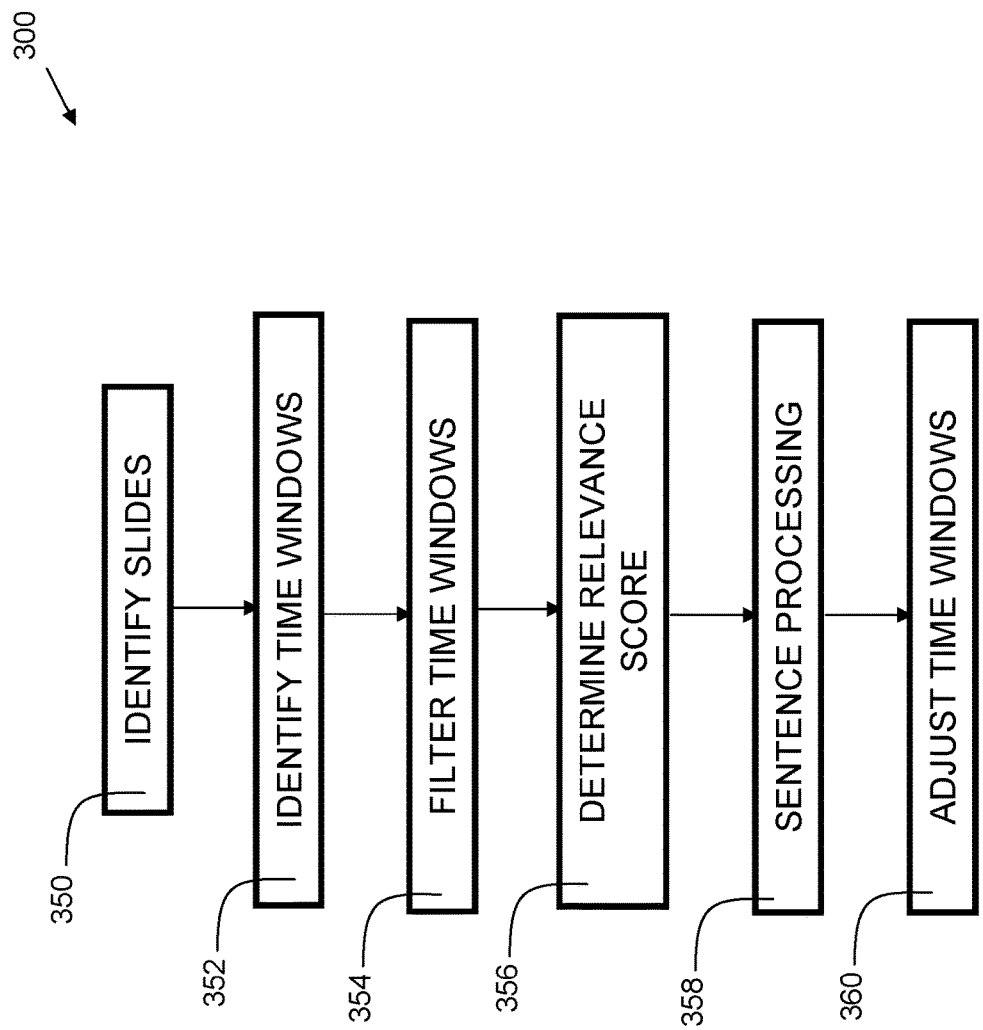
FIG. 3 is a flowchart indicating process steps for embodiments of the present invention.

FIG. 3 is a flowchart 300 indicating process steps for embodiments of the present invention. In process step 350, slides are identified. This can include performing image processing techniques on the frames of a slide presentation video. The image processing techniques can include pixel level filtering, image feature abstraction, object detection, and classification methodologies. The image processing techniques can include edge detection, frequency filtering, color matching, and/or color space transformations. In some embodiments, the edge detection includes use of a Canny image edge filter convolving an image with a Gaussian filter, and using rapid changes in pixel intensity gradients to resolve partial line segments. When the image processing algorithms detect a significant change in the presented image, it may be considered as a new slide. In this way, the various slides of a slide presentation can be automatically identified.

In some embodiments, a new image probability score is determined. The new image probability score represents a probability that a new image and, thus, a new time window, is starting. The new image probability score can be based on mathematical models, machine learning, image classifiers, and/or other suitable techniques. In some embodiments, the new image probability score can be based on keypoint matching. This can include identifying edges and/or corners of an image to extract keypoints and performing a scale-invariant feature transform (SIFT) on the keypoints. In other embodiments, a histogram matching technique may be used. A histogram of an image is generated and compared to a histogram of a subsequent image to determine if the two images are significantly different. In some embodiments, the new image probability score can be obtained by computing the absolute value of the difference between each histogram bucket. A smaller value indicates a closer match. If the value is larger than a predetermined threshold, then the images are deemed to be different, indicative of a new slide. Other image comparison techniques may be used instead of, or in addition to, the aforementioned techniques.

In process step 352, the time windows for each slide occurrence are identified. This may be accomplished by identifying, as the window start, the point in the slide presentation stream (video file) where a slide image is introduced, and identifying, as the window end, the point in the slide presentation stream where the slide image is removed from the video (e.g., when the presenter changes the slide). In embodiments, a computer-implemented process may identify a nearby presentation time stamp (PTS) in order to determine the temporal location of the time window. In some embodiments, the computer-implemented process may identify byte offsets within the slide presentation video file that is associated with the time window and, based on the bitrate of the video file, determine a temporal location for the start and end of each time window.

In process step 354, the time windows are filtered. The filtering can include discarding of time windows that are shorter than a predetermined threshold duration. For example, in embodiments, any time windows that are less than ten seconds may be discarded. Typically, such time windows are the result of quickly passing through slides to access a given slide out of order. Often, in a presentation, a speaker may jump back or ahead to discuss a different slide. The feature of filtering the time windows avoids indexing of time windows that do not have meaningful associated speaker dialog with them.

In process step 356, a relevance score for the time window is determined. In some embodiments, the relevance score is based on the duration of the time window. In some embodiments, the presence of audio during the time window may also factor in to the relevance score. For example, if no speech is present during the time window, the relevance score may be adjusted to indicate less relevance.

In process step 358, sentence processing is performed. This can include performing a speech-to-text process on audio data. In some embodiments, audio data may be in a compressed format such as an MPEG compression format in the slide presentation video file. In such cases, the audio may be decoded to derive pulse code modulated (PCM) audio data. The PCM audio data may then be processed for phoneme identification. Based on the phoneme identification, words are identified, and parts of speech identification of the words is performed to identify sentences. Based on the location of sentences, the time windows may be adjusted. For example, if a sentence starts before the introduction of a particular slide, and ends after the introduction of that slide, then the start time of the time window may be adjusted in process step 360 to be the start of the sentence, rather than the point where the slide is introduced. In this way, when a user requests access to the relevant portion of a slide presentation video corresponding to that slide, the video is indexed to the point where the sentence starts. In this way, the user is presented with any introductory explanation prior to the slide being presented.

Figure 4:
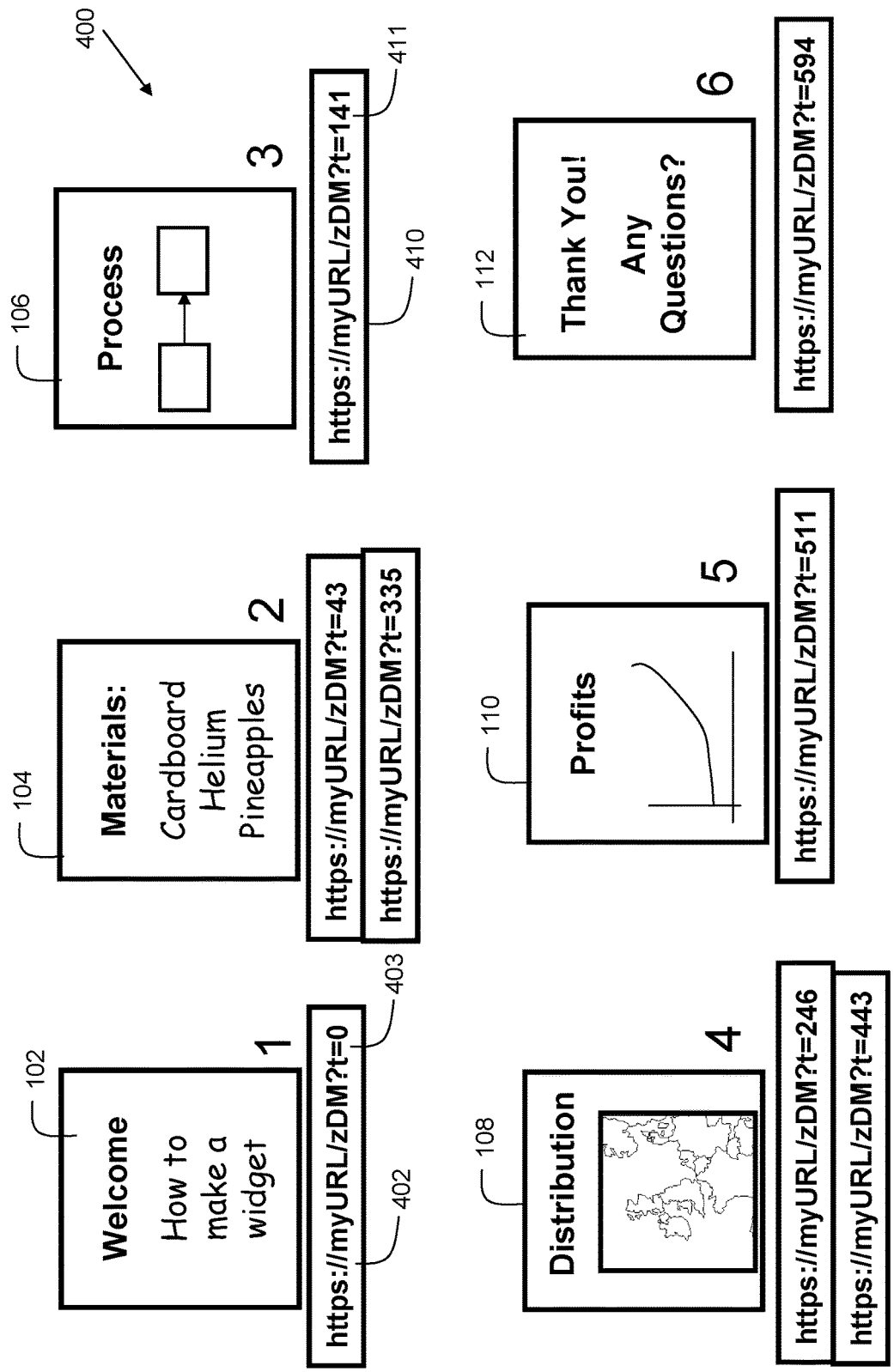
FIG. 4 shows an association of links to a position in the slide presentation video corresponding to the slides of the exemplary slide presentation.

FIG. 4 shows an association of links to a position in the slide presentation video corresponding to the slides of the exemplary slide presentation. In the example 400, each slide is shown with a list of uniform resource locators (URLs) based on a list of time windows for each slide. Each URL serves as a linked index into a slide presentation video. As can be seen in FIG. 4, slides 102, 106, 110, and 112 each have one time window in their corresponding time window list, thus resulting in one URL for each of those slides. Slides 104 and 108 each have two time windows in their corresponding time window list, resulting in two URLs for each of those slides. An example URL is shown at 402. An example time index is shown at 403 with the "?t=0" portion of the URL. Similarly, URL 410 shows a time index 411 of 141 seconds, corresponding to a time of 2:21, which (referring again to FIG. 2) is the start of time window 206, which represents the time within the slide presentation video where slide 3 is discussed. Thus, embodiments can include generating a uniform resource locator including a time index into the slide presentation video.

In some embodiments, a user interface arranged similar to what is shown in FIG. 4 may be presented to a user. The user may be presented with a thumbnail image of each slide, and one or more selectable links associated with each thumbnail image. When the user selects one of the associated selectable links, the user is presented with a corresponding portion of the slide presentation video where the corresponding slide is discussed.

Figure 5:
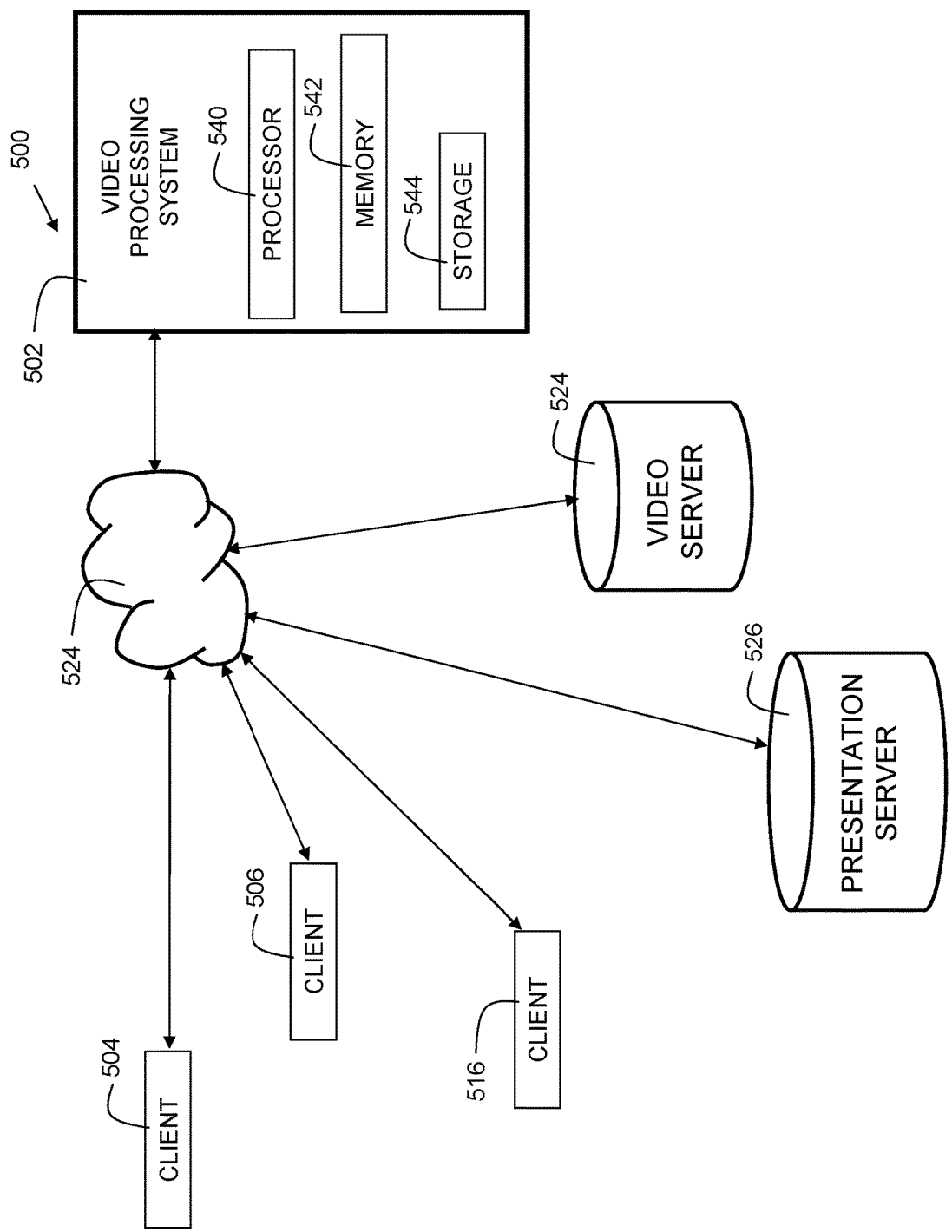
FIG. 5 shows a diagram of a system in accordance with embodiments of the present invention.

FIG. 5 shows a diagram of an environment 500 in accordance with embodiments of the present invention. Video processing system 502 includes a processor 540, memory 542, and storage 544, for storing data and executing functions in accordance with embodiments of the present invention. In embodiments, video processing system 502 may be part of the network infrastructure of a video sharing service. Video processing system 502 is in communication with network 524. Network 524 may be the Internet, local area network (LAN), wide area network (WAN), cloud network, or any other suitable network. The environment includes multiple client devices in communication with network 524, namely, client device 504, client device 506, and client device 516. It should be recognized that although three client devices are shown for the purpose of disclosure, more or fewer may be included in some embodiments. The client devices may be smartphones, tablet computers, laptop computers, desktop computers, or other suitable electronic devices.

The video processing system 502 may receive uploaded slide presentation videos from one or more clients via network 524. The video processing system 502 may then perform processing to determine the portions of the slide presentation video corresponding to each slide. The video processing system 502 may adjust the time windows based on audio processing, natural language processing, sentence processing, and/or other suitable techniques. The video processing system 502 may then serve the processed video to client devices. In some embodiments, the video processing system 502 may send the processed video to a separate video server 524. In some embodiments, each time window from the originally supplied slide presentation video may be encoded as a standalone, secondary video file and stored on the video server 524. Thus, in such an embodiment, each slide may have its own corresponding video file. In cases where a slide has multiple time windows associated with it, the discontinuous portions of the original slide video presentation may be concatenated together to form a secondary video file for a particular slide. In yet other embodiments, the video processing system 502 may access slide presentation videos from a video server, process those videos, determine the time windows, and generate URLs corresponding to the time windows. The URLs and corresponding thumbnail images of each slide may then be loaded onto a presentation server 526. In some embodiments, the original full-sized slides may also be loaded onto the presentation server 526. This embodiment has the advantages of being compatible with any video server/sharing system that supports indexing URLs (URLs that allow specifying a particular temporal position within a video file/stream). For example, since YouTube® supports indexing URLs, such embodiments can process many thousands of existing slide presentation videos available on that site, and provide a searchable user experience for a user, which may appear similar to what is shown in FIG. 4, with thumbnail slide images, and one or more corresponding selectable links for each slide image. However, instead of the example URLs shown in FIG. 4, the URLs can point to a video on YouTube®. Note that while YouTube® is mentioned as an exemplary general purpose video sharing system, another video sharing service can be used with embodiments of the present invention.

In some embodiments, some or all of the aforementioned processing steps may occur on a client device (e.g., client device 504, 506 or 516) instead of on video processing system 502. In such an embodiment, a user may record a presentation on his/her client device, the client device then performs the processing for slide identification, time window identification and adjustment, and other process steps such as those depicted in FIG. 3. The user can then disseminate the processed slide presentation information to other users via network 524 or other suitable network. In some embodiments, there may be a peer-to-peer, and/or ad-hoc network formed for disseminating the processed presentation information. In such embodiments, the need for a video processing system 502 may be reduced or eliminated entirely.

In some embodiments, the user may use his/her client device to process an existing slide presentation video. For example, a user may specify a video on a company intranet site, or public site such as YouTube®. The user may specify the video by selecting the URL from a web page. The client device may then process the video to compute time windows and generate a plurality of URLs for indexing to the portion of the video corresponding to the slides described in the video. As processing power of mobile devices continues to increase, the time required to process slide presentation videos on a mobile device is reduced, making it more convenient to disseminate slide presentation information.

Figure 6:
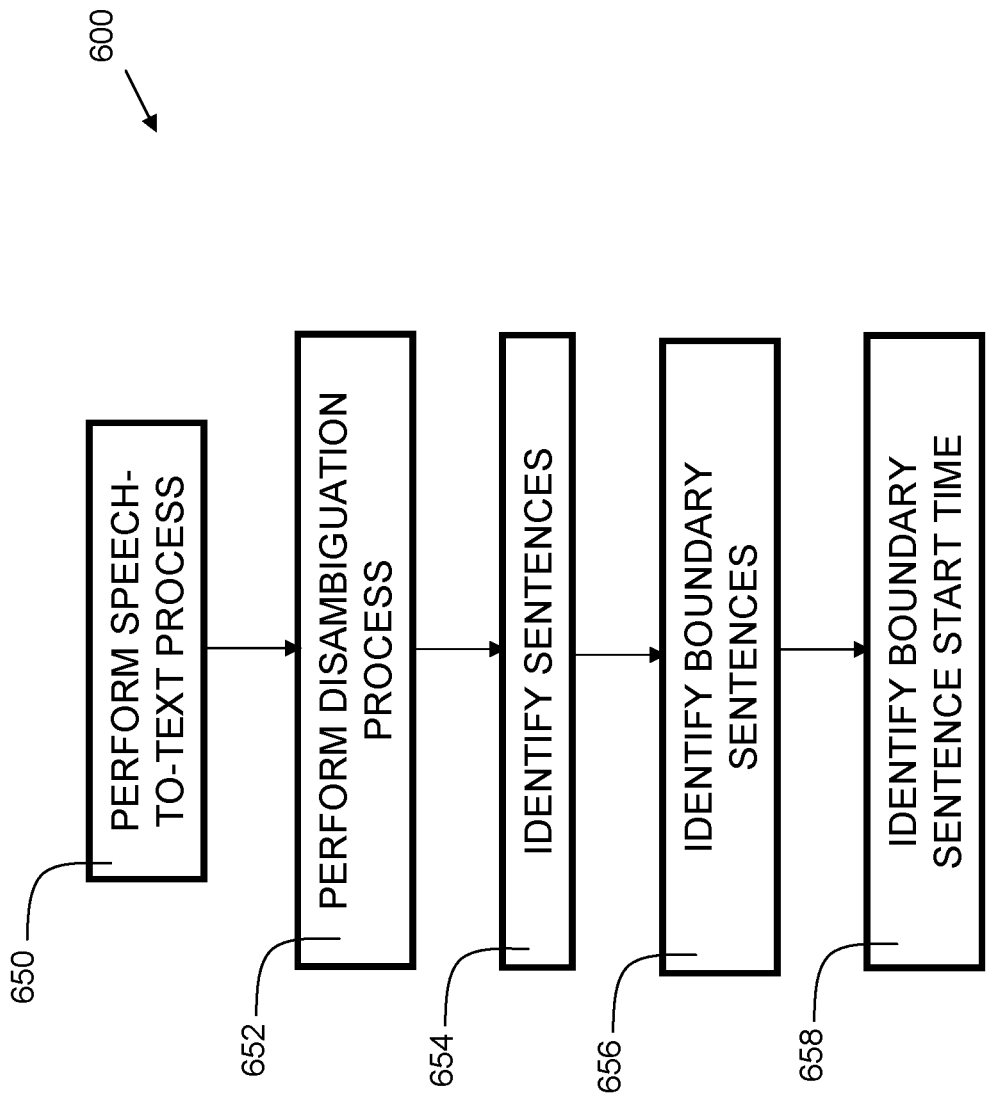
FIG. 6 is a flowchart showing additional details of the adjustment of time windows.

FIG. 6 is a flowchart 600 showing additional details of the adjustment of time windows. At process step 650, a speech-to-text process is performed on the uttered phrase. The speech-to-text process may include transmitting the audio data (e.g., PCM data or compressed audio data) to the analysis system. The analysis system may then perform a phoneme extraction process to extract the phonemes from the audio data. In the English language, there are 44 phonemes. Other languages may have more or fewer phonemes. For example, Spanish has 24 phonemes, while German has 45 phonemes. A variety of tools, such as, e.g., CMU Sphinx, are available for performing phoneme extraction. While the examples disclosed herein use English, disclosed embodiments can be adapted to operate with a variety of languages, including, but not limited to, Spanish, French, Italian, German, Portuguese, Japanese, Chinese, or Russian. Once the phonemes are converted to text, the text may be tokenized into words and tagged with parts of speech.

At process step 652, a disambiguation process is performed. For some words, there can be more than one meaning and/or part of speech. For example, some words are pronounced the same way, such as eight and ate. The disambiguation process may use tokenization and part-of-speech identification to determine the most likely word that matches the phonemes. For example, if a preposition precedes a phoneme that sounds like "eight," then the intended word is most likely to be "ate."

At process step 654, sentences are identified using a computer-implemented sentence analysis process. This may include processing steps such as tokenization, part-of-speech identification, and syntax analysis. At process step 656, boundary sentences are identified. The boundary sentences refer to sentences that have a start time within the slide presentation video while a first slide is being presented, and that have an end time within the slide presentation video while a second slide is being presented. This is important because it can greatly improve the continuity of the subject matter, making it easier for the user to follow. For example, referring again to FIG. 2, the slide 110, pertaining to "Profits" has a particular time window start time, which initially pertains to a temporal point where the image of slide 110 is first detected within the slide presentation video. However, if a boundary sentence starts near the end of the previous slide (slide 108) time window, and that sentence has an end point within the time window of slide 110, then that boundary sentence is said to span two time windows. In process step 658, the start time of each boundary sentence is identified. Since the boundary sentence spans two time windows, it can be advantageous to adjust the start time of the desired slide to be at the start time of the boundary sentence. In this way, when desiring to access the slide presentation video portion pertaining to a particular slide, they are indexed to the temporal position of introductory audio dialog preceding the slide of interest, so the user can hear the introductory speech that corresponds to that slide.

Figure 7:
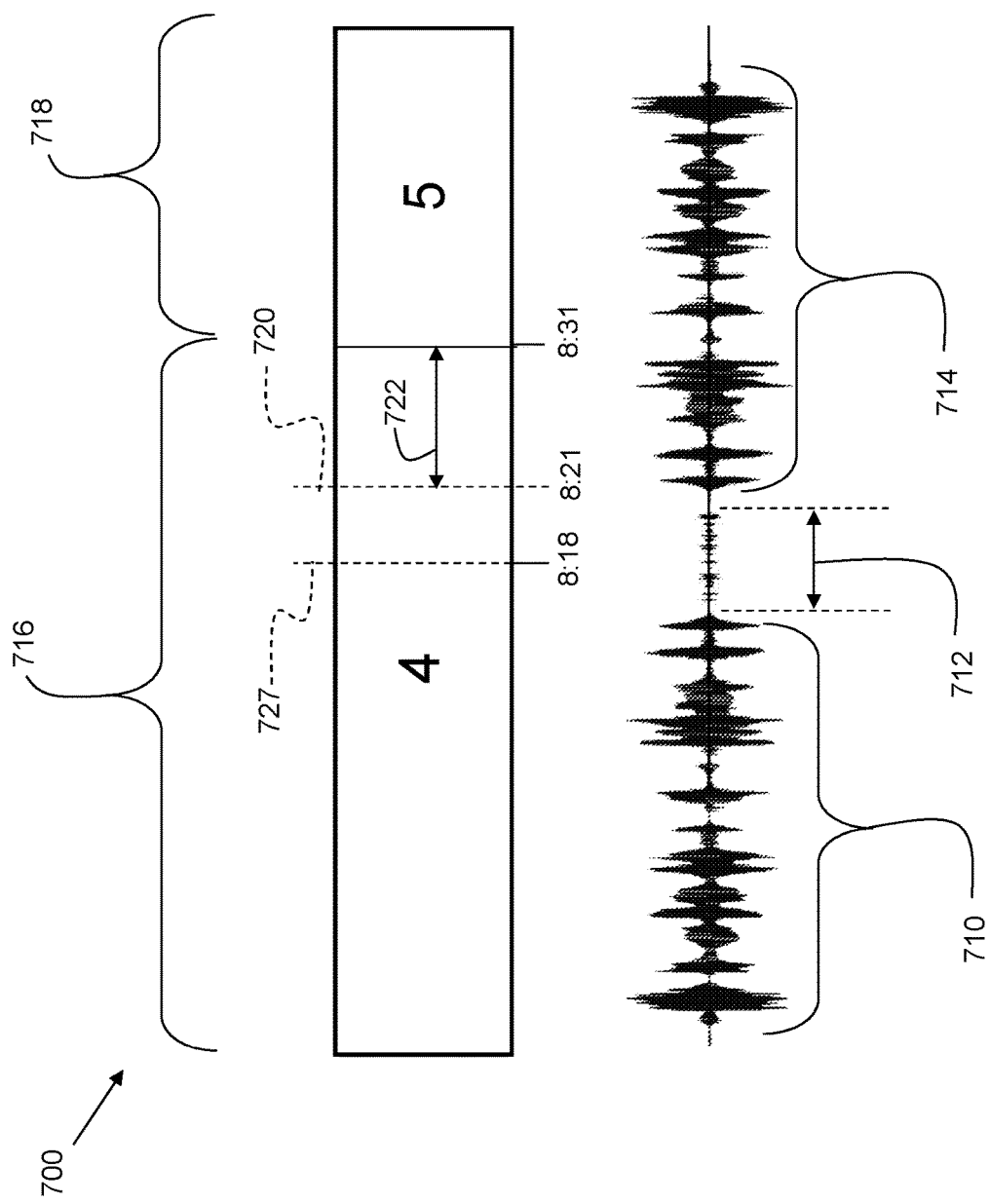
FIG. 7 shows an example adjustment of time windows based on silence detection.

FIG. 7 shows an example 700 of adjustment of time windows based on silence detection. In this embodiment, a simplified approach that utilizes silence detection may be used. While not as sophisticated as performing natural language detection, it can provide time window adjustment based on speech waveform locations. In the example, time window 716 pertains to slide 4, and ends at time 8:31, and time window 718 pertains to slide 5, with its start time at time 8:31. The video processing system (502 of FIG. 5) may perform a silence gap identification process to determine the presence of a boundary waveform. In this example, there are two speech waveforms; waveform 710 and waveform 714. A gap of silence 712 exists between the two waveforms. Note that the silence 712 may be relative silence, rather than absolute silence. Thus, the gap 712 may represent a period of relatively low (but non-zero) sound levels, as compared with the amplitude of waveforms 710 and 714. The gap 712 may be identified by a computer-implemented silence gap identification process that checks the average magnitude of the audio track to identify low audio levels as illustrated with gap 712. The end of the silence gap 712, represented at point 720 within the slide presentation video, may be deemed as the start of a boundary sentence. Thus, the waveform 714 represents a boundary waveform that spans time window 716 (for slide 4) and time window 718 (for slide 5). In embodiments, an adjusted time window for slide 5 can be computed, based on the start of the boundary waveform 714. In some embodiments, the adjusted start time A of time window 718 can be determined as:

$$A = T - G - X$$

Where:

T is the original time window start point where the first image of the slide is identified within a slide presentation video;

G is a gap based on the difference between the start time of the time window of the slide, and the start time of the corresponding boundary waveform; and X is a predetermined constant offset.

In the example of FIG. 7, the value G is represented by the interval indicated by 722 and has a value of ten seconds. Thus, in the example, the original time window start time for slide 5 is 8:31 (511 seconds). However, the boundary waveform start time is determined to be 8:21. Optionally, a predetermined constant offset X may be further subtracted from the original start time. This allows a few seconds for cueing the video prior to the start of the speech of the boundary waveform, which can make for an improved user experience. In this example, the value of X is three seconds. Thus, the adjusted start time window A is:

A=511−10−3=498=8:18

Thus, the adjusted start time is 8:18, indicated in FIG. 7 by reference no. 727. In this way, when the user selects the portion of the slide presentation video pertaining to slide 5, the user is presented with the slide presentation video starting at time 8:18, even though slide 5 does not appear in the video until time 8:31. This allows the user to hear possible lead-in explanation for slide 5. Note that while the example illustrated in FIG. 7 shows an instance of adjusting a start time of a time window to be earlier, it is also possible to adjust an ending time of a time window. For example, if a boundary waveform exists at the end of a time window for a slide, the ending time for the time window can be adjusted based on the ending time of the boundary waveform. Thus, embodiments may include analyzing an audio track of the slide presentation video to perform a silence gap identification process, and identifying a boundary waveform based on a silence gap identified from the silence gap identification process. In such embodiments, generating a link to a position in the slide presentation video includes generating a link to a position corresponding to the start time for a boundary waveform that spans a start of the time window for at least one slide.

Figure 8:
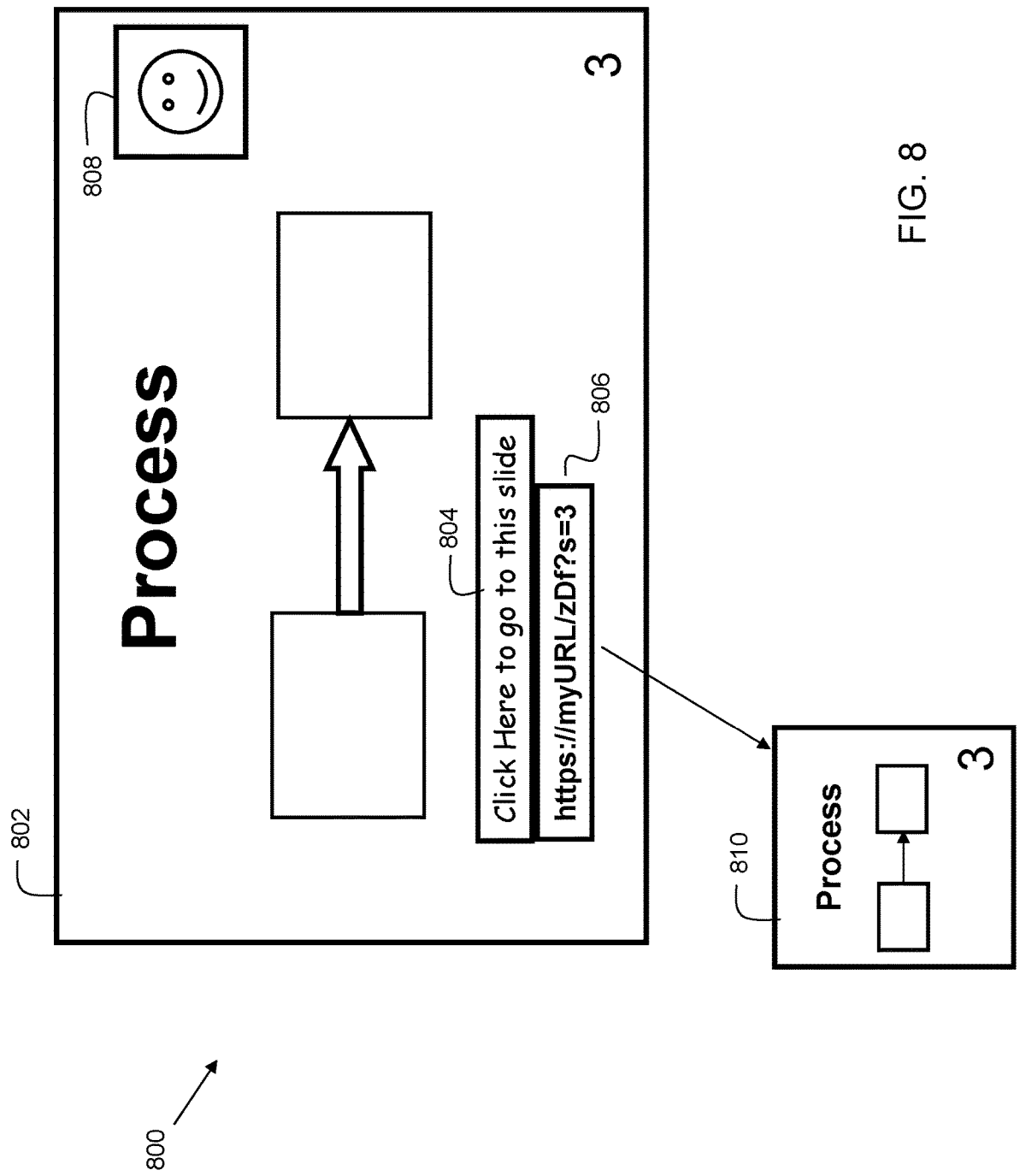
FIG. 8 shows an exemplary user interface for accessing slides from a video presentation in accordance with embodiments of the present invention.

FIG. 8 shows an exemplary user interface 800 for accessing slides from a video presentation in accordance with embodiments of the present invention. In some embodiments, the video presentation system (502 of FIG. 5) may render a selectable link as an overlay on the video presentation. In this example the video 802 has an image of a presentation slide on it, with a presenter shown as a picture-in-picture (PiP) window 808. As the processed slide video presentation is being viewed, a selectable link 806 is presented on the display over the video. A message 804 may be displayed. In embodiments, the selectable link 806 may not be visible on the screen. In embodiments, the message 804 may be selectable and invoke the link 806 when selected. Selecting the link can invoke an image of the corresponding slide, as indicated at 810. In this way, as a user views a processed slide presentation video, the user can select a given slide that the user wishes to view in more detail. In embodiments, the slide may be presented as an image file such as a JPEG image, PNG image, bitmap, or other suitable file format. The slide may also be presented as a PDF file, PowerPoint® file, or other suitable file format. Thus, embodiments can include presenting a selectable link on the slide presentation video for at least one slide shown in the slide presentation video, wherein the selectable link accesses a corresponding slide for the slide presentation video.

Figure 9:
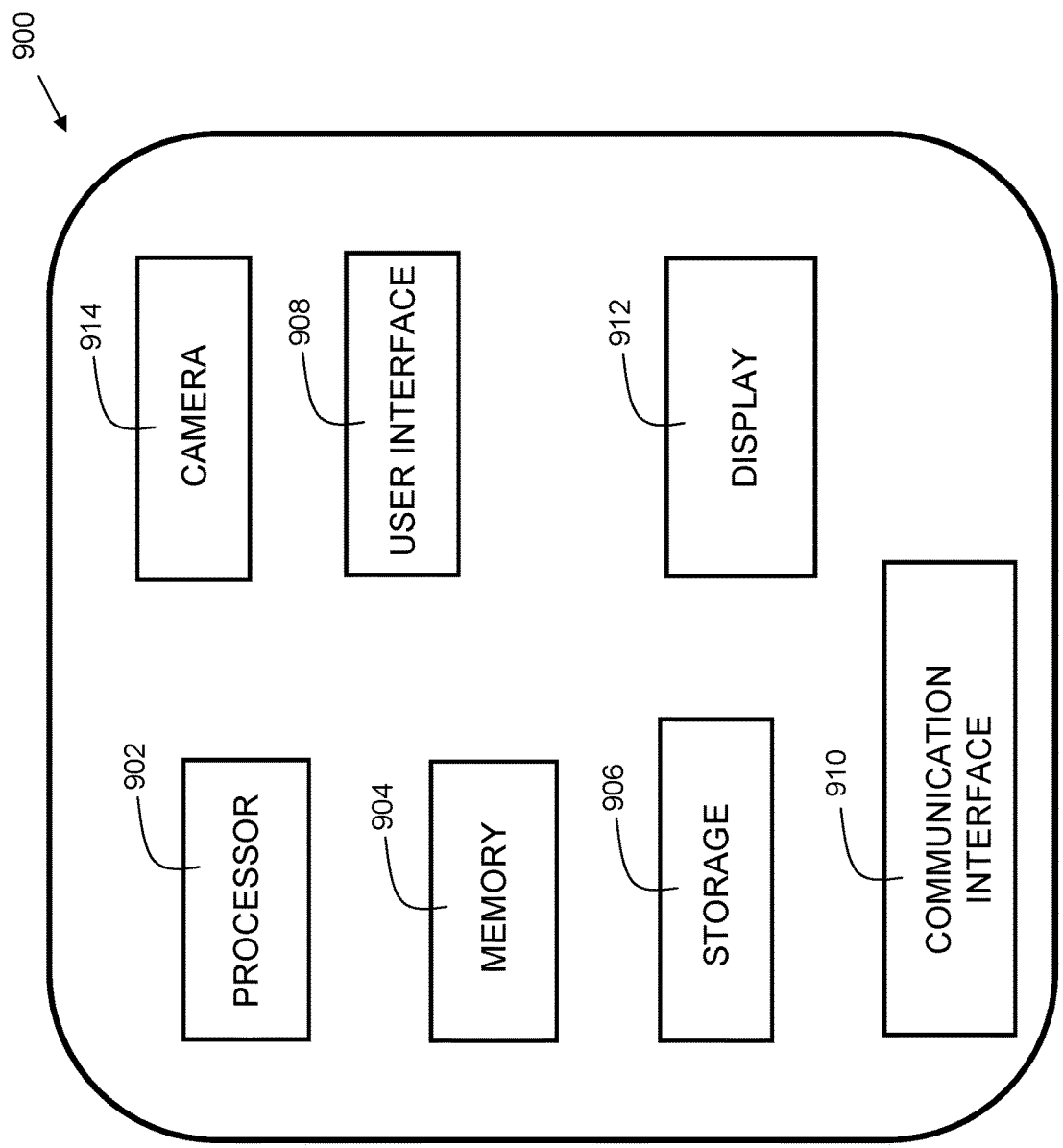
FIG. 9 shows a block diagram of a client device in accordance with embodiments of the present invention.

FIG. 9 shows a block diagram of a client device in accordance with embodiments of the present invention. Device 900 is shown as a simplified diagram of modules. Device 900 is an electronic computing device. Device 900 includes a processor 902, which is coupled to a memory 904. Memory 904 may include dynamic random access memory (DRAM), static random access memory (SRAM), magnetic storage, and/or a read only memory such as flash, EEPROM, optical storage, or other suitable memory. In some embodiments, the memory 904 may not be a transitory signal per se. Memory 904 includes instructions, which when executed by the processor, may implement steps of the present invention. In embodiments, device 900 may have multiple processors 902, and/or multiple cores per processor.

Device 900 may further include storage 906. In embodiments, storage 906 may include one or more magnetic storage devices such as hard disk drives (HDDs). Storage 906 may include one or more solid state drives (SSDs). Any other storage device may be included instead of, or in addition to, those disclosed herein.

Device 900 further includes a user interface 908, examples of which include a keyboard, mouse, and/or a touch screen incorporated into display 912.

The device 900 further includes a communication interface 910. In embodiments, the communication interface 910 may include a wireless communication interface that includes modulators, demodulators, and antennas for a variety of wireless protocols including, but not limited to, Bluetooth™, Wi-Fi, and/or cellular communication protocols for communication over a computer network.

The device 900 may further include a display 912. Display 912 may include, but is not limited to, a liquid crystal display (LCD), a plasma display, a cathode ray tube (CRT) display, a light emitting diode (LED) display, an organic LED (OLED) display, or other suitable display type. In embodiments, the display may be a touchscreen such as a capacitive or resistive touchscreen that also serves as a user interface.

The device 900 may further include a camera 914. Camera 914 may be a video camera that is capable of recording a slide presentation video. The slide presentation video can be uploaded to a video process system (502 of FIG. 5) for processing to create a plurality of selectable links corresponding to the various slides within the slide presentation. The time windows for each slide presentation may be adjusted based on audio processing as described previously.

Figure 10:
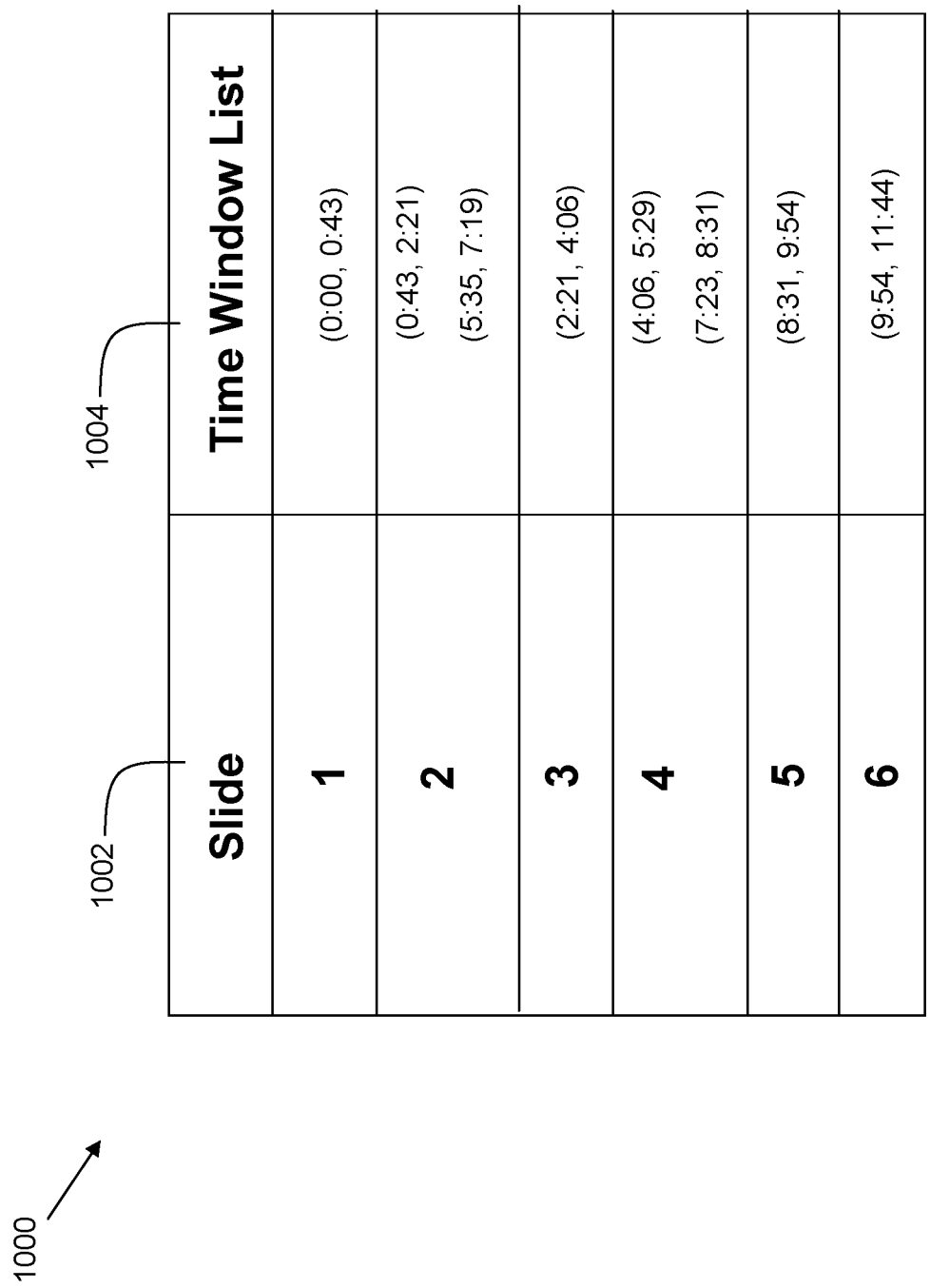
FIG. 10 shows an example data structure including a list of slides and a corresponding list of time windows for each slide.

FIG. 10 shows an example data structure 1000 including a list of slides and a corresponding list of time windows for each slide. Column 1002 of the data structure 1000 stores slide numbers of a slide presentation. Column 1004 of the data structure 1000 stores a corresponding list of time windows for each slide. In the example, some slides have only one time window, while other slides have two time windows. In practice, there can be more than two time windows for a slide.

Figure 11:
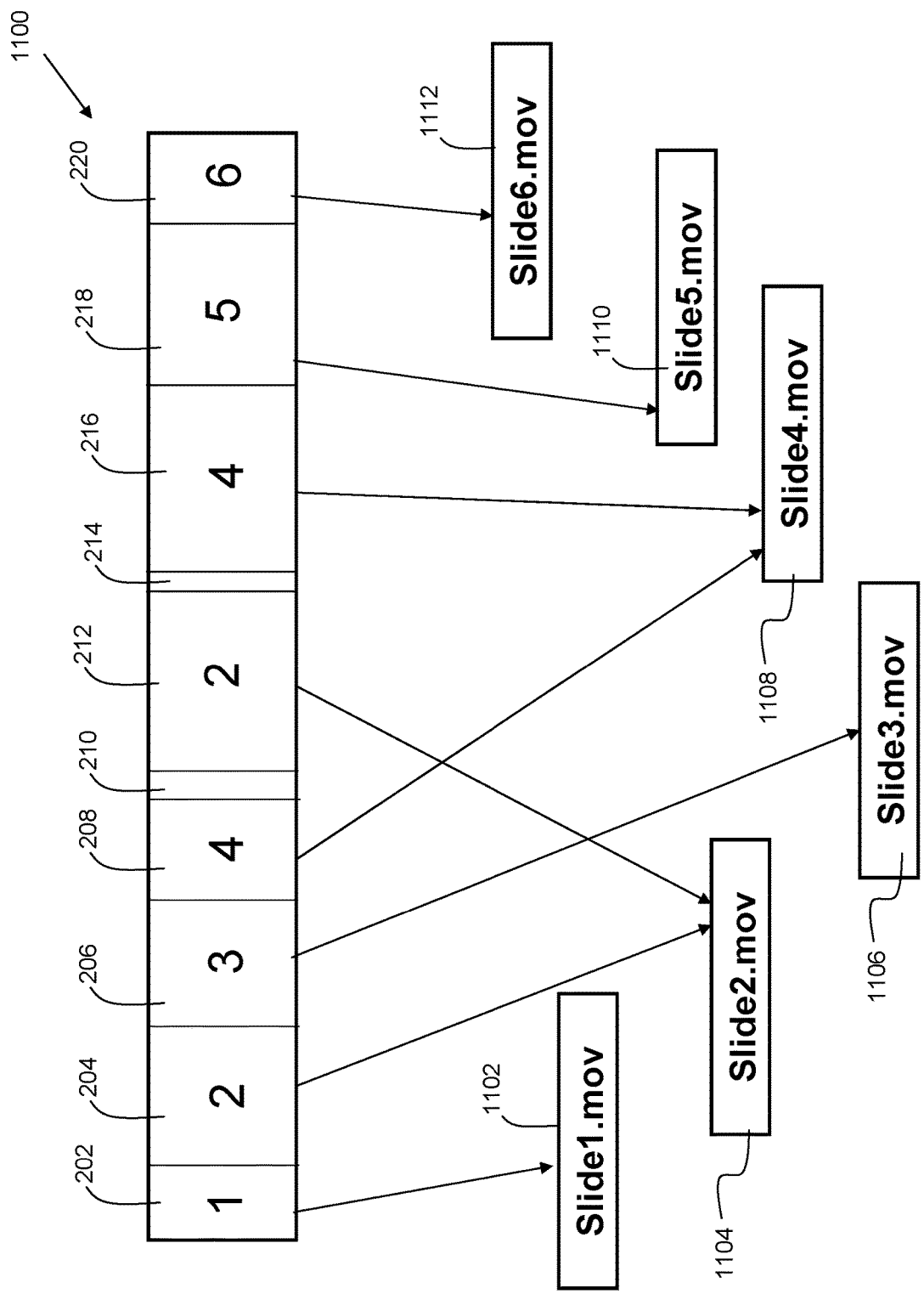
FIG. 11 shows an example of creating standalone secondary video files.

FIG. 11 shows an example 1100 of creating standalone secondary video files. In this embodiment, the portions of the original slide video presentation are split into separate video files. The portion of the original slide video 1 (reference 202) is used to create file slide1.mov 1102. The portions of the original slide video 2 (reference 204 and reference 212) are used to create file slide2.mov 1104. The two original portions 204 and 212 may be spliced or concatenated together, or re-encoded to create the single file 1104. The portion of the original slide video 3 (reference 206) is used to create file slide3.mov 1106. The portions of the original slide video 4 (reference 208 and reference 216) are used to create file slide4.mov 1108. The portion of the original slide video 5 (reference 218) is used to create file slide5.mov 1110. The portion of the original slide video 6 (reference 220) is used to create file slide6.mov 1112. Such an embodiment can be useful in cases where the indexed presentation video is intended for distribution on a random access computer-readable medium such as a DVD, USB flash drive, or other suitable computer-readable medium. Thus, embodiments can include creating a secondary video file for each time window with a relevance score exceeding a predetermined threshold (or each unfiltered time window), wherein the secondary video file comprises content of the slide presentation video during the corresponding time window.

As can now be appreciated, disclosed embodiments provide techniques for enabling searchable multimedia presentations. Slide presentation videos are preprocessed to identify time windows where each slide appears. Transient slides are filtered out so that slides that are only presented for a short time while the presenter is moving around within a slide deck are not included in the indexed information. In many slide decks, the slides themselves may only contain high level information, and the details are provided in the spoken presentation. With disclosed embodiments, those spoken details are quickly and conveniently indexed by computer-implemented techniques so that they can be easily accessed by a user at a later time. This greatly improves the dissemination of information for corporate, education, and other purposes.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices, or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, location determination and alert message and/or coupon rendering may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, may be non-transitory, and thus is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Program data may also be received via the network adapter or network interface.

Computer readable program instructions for carrying out operations of embodiments of the present invention may be assembler instructions, instruction-set-architecture (ISA)

instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

While the disclosure outlines exemplary embodiments, it will be appreciated that variations and modifications will occur to those skilled in the art. For example, although the illustrative embodiments are described herein as a series of acts or events, it will be appreciated that the present invention is not limited by the illustrated ordering of such acts or events unless specifically stated. Some acts may occur in different orders and/or concurrently with other acts or events apart from those illustrated and/or described herein, in accordance with the invention. In addition, not all illustrated steps may be required to implement a methodology in accordance with embodiments of the present invention. Furthermore, the methods according to embodiments of the present invention may be implemented in association with the formation and/or processing of structures illustrated and described herein as well as in association with other structures not illustrated. Moreover, in particular regard to the various functions performed by the above-described components (assemblies, devices, circuits, etc.), the terms used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of embodiments of the invention may have been disclosed with respect to only one of several embodiments, such feature may be combined with one or more features of the other embodiments as may be desired and advantageous for any given or particular application. Therefore, it is to be understood that the appended claims are intended to cover all such modifications and changes that fall within the true spirit of embodiments of the invention.

What is claimed is:

1. A computer-implemented method for creating a linked index for a slide presentation video, comprising:
   detecting a plurality of slides in a slide presentation video, wherein each slide is detected as a separate image from another;
   generating a list of slides;
   determining a list of time windows for each slide, wherein a time window is a duration between a time a slide is introduced and a time the slide is removed from the slide presentation video;
   determining a relevance score for each time window;
   creating a list including a start time and an end time for each sentence; and
   for each time window with the relevance score exceeding a predetermined threshold, generating a link to a position in the slide presentation video corresponding to the start time for a sentence that spans a start of the time window of a corresponding slide, wherein the link is associated with a slide from the list of slides.

2. The method of claim 1, further comprising:
   performing a speech-to-text analysis on an audio track of the slide presentation video;
   performing a sentence analysis process on text generated from the speech-to-text analysis; and
   using a result of the sentence analysis process in creating the list including the start time and the end time for each sentence.

3. The method of claim 2, further comprising discarding a time window in response to a duration of the time window being less than a predetermined threshold.

4. The method of claim 1, further comprising:
   performing a silence gap identification process on an audio track of the slide presentation video;
   identifying a boundary waveform based on a silence gap identified from the silence gap identification process; and
   wherein generating the link to the position in the slide presentation video comprises generating a link to a position corresponding to a start time for a boundary waveform that spans a start of the time window for at least one slide.

5. The method of claim 1, wherein the generating the link includes generating a uniform resource locator including a time index into the slide presentation video.

6. The method of claim 1, further comprising presenting a selectable link on the slide presentation video for at least one slide shown in the slide presentation video, wherein the selectable link accesses a corresponding slide for the slide presentation video.

7. The method of claim 1, further comprising creating a secondary video file for each time window with a relevance score exceeding a predetermined threshold, wherein the secondary video file comprises content of the slide presentation video during a corresponding time window.

8. An electronic device comprising:
a processor;
a memory coupled to the processor, the memory containing instructions, that when executed by the processor, perform the steps of:
detecting a plurality of slides in a slide presentation video, wherein each slide is detected as a separate image from another;
generating a list of slides;
determining a list of time windows for each slide, wherein a time window is a duration between a time a slide is introduced and a time the slide is removed from the slide presentation video;
determining a relevance score for each time window;
creating a list including a start time and an end time for each sentence; and
for each time window with the relevance score exceeding a predetermined threshold, generating a link to a position in the slide presentation video corresponding to the start time for a sentence that spans a start of the time window of a corresponding slide, wherein the link is associated with a slide from the list of slides.

9. The electronic device of claim 8, wherein the memory further contains instructions, that when executed by the processor, perform the steps of:
performing a speech-to-text analysis on an audio track of the slide presentation video;
performing a sentence analysis process on text generated from the speech-to-text analysis; and
using a result of the sentence analysis process in creating the list including the start time and the end time for each sentence.

10. The electronic device of claim 8, wherein the memory further contains instructions, that when executed by the processor, perform the step of discarding a time window in response to a duration of the time window being less than a predetermined threshold.

11. The electronic device of claim 8, wherein the memory further contains instructions, that when executed by the processor, perform the steps of:
analyzing an audio track of the slide presentation video to perform a silence gap identification process;
identifying a boundary waveform, based on a silence gap identified from the silence gap identification process; and
wherein generating a link to a position in the slide presentation video comprises generating a link to a position corresponding to the start time for a boundary waveform that spans a start of the time window for at least one slide.

12. The electronic device of claim 8, wherein the memory further contains instructions, that when executed by the processor, perform the step of generating a uniform resource locator including a time index into the slide presentation video.

13. The electronic device of claim 8, wherein the memory further contains instructions, that when executed by the processor, perform the step of presenting a selectable link on the slide presentation video for at least one slide shown in the slide presentation video, wherein the selectable link accesses a corresponding slide for the slide presentation video.

14. The electronic device of claim 8, wherein the memory further contains instructions, that when executed by the processor, perform the step of creating a secondary video file for each time window with a relevance score exceeding a predetermined threshold, wherein the secondary video file comprises content of the slide presentation video during the corresponding time window.

15. A computer program product for creating a linked index for a slide presentation video on an electronic computing device, the electronic computing device comprising a computer readable storage medium having program instructions embodied therewith, the program instructions executable by a processor to cause the electronic computing device to:
detect a plurality of slides in a slide presentation video, wherein each slide is detected as a separate image from another;
generate a list of slides;
determine a list of time windows for each slide, wherein a time window is a duration between a time a slide is introduced and a time the slide is removed from the slide presentation video;
determine a relevance score for each time window;
create a list including a start time and an end time for each sentence; and
for each time window with the relevance score exceeding a predetermined threshold, generate a link to a position in the slide presentation video corresponding to the start time for a sentence that spans a start of the time window of a corresponding slide, wherein the link is associated with a slide from the list of slides.

16. The computer program product of claim 15, further comprising program instructions executable by the processor to cause the electronic computing device to:
perform a speech-to-text analysis on an audio track of the slide presentation video;
perform a sentence analysis process on text generated from the speech-to-text analysis; and
use a result of the sentence analysis process in creating the list including the start time and the end time for each sentence.

17. The computer program product of claim 16, further comprising program instructions executable by the processor to cause the electronic computing device to discard a time window in response to a duration of the time window being less than a predetermined threshold.

18. The computer program product of claim 16, further comprising program instructions executable by the processor to cause the electronic computing device to:
analyze an audio track of the slide presentation video to perform a silence gap identification process;
identify a boundary waveform, based on a silence gap identified from the silence gap identification process; and
generate a link to a position in the slide presentation video that references a position corresponding to the start time for a boundary waveform that spans a start of a time window for at least one slide.

19. The computer program product of claim 15, further comprising program instructions executable by the processor to cause the electronic computing device to generate a uniform resource locator including a time index into the slide presentation video.

20. The computer program product of claim 15, further comprising program instructions executable by the processor to cause the electronic computing device to present a selectable link on the slide presentation video for at least one slide shown in the slide presentation video, wherein the selectable link accesses a corresponding slide for the slide presentation video.

\* \* \* \* \*